US007836127B2

(12) United States Patent
Deane et al.

(10) Patent No.: US 7,836,127 B2
(45) Date of Patent: Nov. 16, 2010

(54) DYNAMICALLY TRIGGERING NOTIFICATIONS TO HUMAN PARTICIPANTS IN AN INTEGRATED CONTENT PRODUCTION PROCESS

(75) Inventors: Stephen Deane, London (GB); Julian Paul Thomas, Herts (GB)

(73) Assignee: Accenture Global Services Limited, Bublin (IE)

( * ) Notice: Subject to any disclaimer, the term of this patent is extended or adjusted under 35 U.S.C. 154(b) by 1184 days.

(21) Appl. No.: 11/364,411

(22) Filed: Feb. 27, 2006

(65) Prior Publication Data

US 2007/0005385 A1 Jan. 4, 2007

Related U.S. Application Data

(60) Provisional application No. 60/671,375, filed on Apr. 14, 2005.

(51) Int. Cl.
  *G06F 15/16* (2006.01)
(52) U.S. Cl. .................. 709/204; 709/203; 709/205; 709/206; 709/219; 709/223; 705/51; 705/8; 705/9; 705/26; 705/39; 717/1; 717/7; 717/8; 717/103; 707/3; 707/10; 707/104
(58) Field of Classification Search ............... 709/201, 709/219, 229, 231, 214, 203–206, 223; 719/321, 719/329, 317, 332, 310; 717/101, 102, 1, 717/7, 8, 103; 705/51, 8, 9, 26, 39, 1; 707/3, 707/10, 104
  See application file for complete search history.

(56) References Cited

U.S. PATENT DOCUMENTS

| 6,065,047 | A | 5/2000 | Carpenter et al. |
| 6,307,573 | B1 | 10/2001 | Barros |

| 6,345,292 | B1 * | 2/2002 | Daugherty et al. .......... 709/214 |

(Continued)

FOREIGN PATENT DOCUMENTS

GB 2396225 A 6/2004

(Continued)

OTHER PUBLICATIONS

Official Communication, mailed by the Austrian Patent Office on Dec. 22, 2009, in corresponding Patent Application No. 200716804-0, 4 pages.

*Primary Examiner*—Wing F Chan
*Assistant Examiner*—Benjamin M Thieu
(74) *Attorney, Agent, or Firm*—Finnegan, Henderson, Farabow, Garrett & Dunner, LLP

(57) ABSTRACT

An integrated content production environment includes a connected services framework providing connectivity to a set of applications that produce content for the media industry. Users in their roles use the integrated environment to perform setting up, ingesting, logging, selecting, editing, reviewing, playout, distributing, and archiving activities. Notifications are dynamically triggered to users when their action is requested. The notifications may be instant messages, e-mails, voice mails, etc. Throughout the production of content, actions by both users the applications are tracked and stored in a log file for processing. The action data in the log file may include payload data from messages. When one or more applications or when one or more users of the environment have excess capacity, that capacity can be leveraged. External users can purchase or bid on the excess capacity and can then access the environment through available web services.

33 Claims, 16 Drawing Sheets

U.S. PATENT DOCUMENTS

| | | | |
|---|---|---|---|
| 6,381,594 B1* | 4/2002 | Eichstaedt et al. | 707/3 |
| 6,464,583 B1* | 10/2002 | Kidron | 463/25 |
| 6,684,254 B1* | 1/2004 | Dutta | 709/229 |
| 6,763,384 B1 | 7/2004 | Gupta et al. | |
| 6,856,997 B2 | 2/2005 | Lee et al. | |
| 7,647,631 B2 | 1/2010 | Sima | |
| 2002/0010744 A1* | 1/2002 | Prell et al. | 709/205 |
| 2002/0087740 A1 | 7/2002 | Castanho et al. | |
| 2002/0131565 A1* | 9/2002 | Scheuring et al. | 379/88.19 |
| 2002/0138449 A1 | 9/2002 | Kendall et al. | |
| 2002/0143901 A1* | 10/2002 | Lupo et al. | 709/219 |
| 2002/0147986 A1* | 10/2002 | Michael et al. | 725/110 |
| 2002/0156691 A1* | 10/2002 | Hughes et al. | 705/26 |
| 2003/0037139 A1* | 2/2003 | Shteyn | 709/225 |
| 2003/0154300 A1* | 8/2003 | Mostafa | 709/231 |
| 2003/0204756 A1 | 10/2003 | Ransom et al. | |
| 2004/0162783 A1* | 8/2004 | Gross | 705/51 |
| 2004/0199867 A1 | 10/2004 | Brandenborg | |
| 2004/0225390 A1 | 11/2004 | Keller et al. | |
| 2005/0097236 A1 | 5/2005 | Delaney et al. | |
| 2006/0224503 A1* | 10/2006 | Luo | 705/39 |

FOREIGN PATENT DOCUMENTS

| | | |
|---|---|---|
| WO | WO 00/65513 A2 | 11/2000 |
| WO | WO 2004/063830 A2 | 7/2004 |
| WO | WO 2004/090787 A2 | 10/2004 |

* cited by examiner

CONNECTED SERVICES FRAMEWORK
FOR THE BROADCAST AND FILM INDUSTRY

▶ ORDER MEDIA

DETAILS
TITLE: MS STUDIOS LOBBY
DESCRIPTION: DARK SHOT OF THE DOOR OF THE MS STUDIOS LOBBY.
TECHNICAL DETAILS ▶
PLAY MEDIA

DETAILS
TITLE: CSF TO SERVER SETUP
DESCRIPTION: TECHNICIANS SETTING UP SERVERS IN PREPARATION FOR NAB DEMONSTRATION. PAN TO SERVER RACK.
TECHNICAL DETAILS ▶
PLAY MEDIA

COMMENTS:
EDIT THESE TWO CLIPS TOGETHER. START THE LOBBY CLIP WITH A FADE FROM BLACK AND RUN TO TIMECODE 11:03:12. WPE TRANSITION TO CSF SERVER SETUP CLIP TO RUN FULL LENGTH.
— 810

SEND TO EDIT — 815

▶ MEDIA PREVIEW

STOPPED

USER INFO:
TOM LOGGER

CURRENT PROJECT
PROMO SHORT FOR
NAB 2005 CSF
DEMONSTRATION ▶
ID: 7111942661
SHORT PROMOTIONAL VIDEO FOR NAB 2005 CONNECTED SERVICES FRAMEWORK FOR BROADCAST AND FILM DEMONSTRATION. INTEGRATING PBS NOVA CONTENT WITH CONTENT CAPTURED ON PANASONIC P2 CAMERA.
   ☐ HOME
   ☐ MANAGE ASSETS
   ☐ ASSET SELECTION
   ☐ REVIEW
   ☐ DISTRIBUTE

ADMIN PROJECT ▶

MEMBERS ▲
JOE VIDEO
NANCY EXECUTIVE
SALLY EDITOR
TIM LOGGER
TOM PRODUCER

| MESSAGE | PAYLOAD | TIME STAMP |
|---|---|---|
| ACTION | MESSAGE | |
| TRANSCODEINGESTCOMPLETE | TRANSCODEINGESTCOMPLETE | 3/30/2005 10:15:04 PM |
| CREATEINGESTASSETCOMPLETE | CREATEINGESTASSETCOMPLETE | 3/30/2005 10:50:37 PM |
| TRANSCODEINGESTCOMPLETE | TRANSCODEINGESTCOMPLETE | 3/30/2005 10:54:45 PM |
| CREATEINGESTASSETCOMPLETE | CREATEINGESTASSETCOMPLETE | 3/30/2005 10:55:04 PM |
| TRANSCODEINGESTCOMPLETE | TRANSCODEINGESTCOMPLETE | 3/30/2005 10:56:14 PM |
| CREATEINGESTASSETCOMPLETE | CREATEINGESTASSETCOMPLETE | 3/30/2005 10:58:07 PM |
| CREATEINGESTASSETCOMPLETE | CREATEINGESTASSETCOMPLETE | 3/30/2005 10:59:04 PM |
| TRANSCODEINGESTCOMPLETE | TRANSCODEINGESTCOMPLETE | 3/31/2005 1:15:14 PM |
| CREATEINGESTASSETCOMPLETE | CREATEINGESTASSETCOMPLETE | 3/31/2005 1:18:04 PM |
| TRANSCODEINGESTCOMPLETE | TRANSCODEINGESTCOMPLETE | 3/31/2005 3:15:09 PM |
| CREATEINGESTASSETCOMPLETE | CREATEINGESTASSETCOMPLETE | 3/31/2005 3:46:00 PM |
| TRANSCODEINGESTCOMPLETE | TRANSCODEINGESTCOMPLETE | 3/31/2005 3:55:04 PM |
| CREATEINGESTASSETCOMPLETE | CREATEINGESTASSETCOMPLETE | 3/31/2005 4:15:03 PM |
| TRANSCODEINGESTCOMPLETE | TRANSCODEINGESTCOMPLETE | 3/31/2005 4:28:08 PM |
| CREATEINGESTASSETCOMPLETE | CREATEINGESTASSETCOMPLETE | 3/31/2005 4:44:00 PM |
| MOVETOEDITCOMPLETE | MOVETOEDITCOMPLETE | 3/31/2005 5:15:04 PM |
| MOVETOEDITCOMPLETE | MOVETOEDITCOMPLETE | 3/31/2005 6:22:31 PM |
| MOVETOEDITCOMPLETE | MOVETOEDITCOMPLETE | 3/31/2005 6:55:23 PM |
| MOVETOEDITCOMPLETE | MOVETOEDITCOMPLETE | 3/31/2005 7:15:04 PM |
| MOVETOEDITCOMPLETE | MOVETOEDITCOMPLETE | 3/31/2005 8:25:27 PM |
| TRANSCODEINGESTCOMPLETE | TRANSCODEINGESTCOMPLETE | 3/31/2005 8:28:04 PM |
| CREATEINGESTASSETCOMPLETE | CREATEINGESTASSETCOMPLETE | 4/1/2005 10:10:08 AM |
| TRANSCODEINGESTCOMPLETE | TRANSCODEINGESTCOMPLETE | 4/1/2005 10:15:04 AM |
| CREATEINGESTASSETCOMPLETE | CREATEINGESTASSETCOMPLETE | 4/1/2005 10:17:07 AM |
| CAMERAINSERT | CAMERAINSERT | 4/1/2005 10:18:34 AM |
| CAMERAINSERT | CAMERAINSERT | 4/1/2005 10:55:28 AM |
| CAMERAINSERT | CAMERAINSERT | 4/1/2005 11:45:02 AM |
| CAMERAINSERT | CAMERAINSERT | 4/1/2005 12:15:04 PM |
| CAMERAINSERT | CAMERAINSERT | 4/1/2005 1:24:07 PM |
| CAMERAINSERT | CAMERAINSERT | 4/1/2005 1:35:18 PM |
| CAMERAINSERT | CAMERAINSERT | 4/1/2005 2:15:04 PM |
| CAMERAINSERT | CAMERAINSERT | 4/1/2005 2:53:01 PM |

FIG. 14

DYNAMICALLY TRIGGERING NOTIFICATIONS TO HUMAN PARTICIPANTS IN AN INTEGRATED CONTENT PRODUCTION PROCESS

RELATED APPLICATION

This application claims the benefit of U.S. Provisional Application No. 60/671,375 filed Apr. 14, 2005, titled "CONNECTED SERVICES FRAMEWORK FOR THE MEDIA AND ENTERTAINMENT INDUSTRY", which is incorporated herein by reference.

BACKGROUND OF THE INVENTION

This invention relates to the production of content for the media industry, and more specifically it relates to a system that seamlessly connects all aspects of the digital broadcast production process.

A fundamental change is occurring in the media and entertainment industry; content is being digitized. Music is now often purchased as a digital file from an on-line music store and the listened to with an MP3 player. Already some television shows and movies may similarly be purchased and downloaded. The post production of movies and television programming is also often handled electronically in digital format.

There are now a number of software systems used in the content production process. Each tool is used for a certain purpose and many of the tools are excellent performers. Unfortunately, these tools create "digital islands" in which manual processes are still required to move content from one island to another. These manual processes introduce unnecessary delays in the production process, which slows down the time it takes to bring content to market. Because so much of the process is still handled manually, it is difficult and time consuming to track the status of the various content assets being worked on.

Because the content is moved from one tool to another tool manually, the current production methodology does not offer enough protection against piracy. The current production methodology also lacks a way to readily introduce new or improved software products. As a result, new software products are haphazardly added to the process without a smooth integration with the other tools.

The present method for content production is deficient in several ways. There is a need for a content production system in which the various software tools are flexibly connected and the amount of manual work is minimized. There is a need to minimize delays that are caused when waiting for a person to perform a manual task. There is also a need to leverage the excess capacity of the content production system to minimize downtime and maximize revenue. There is a need to track the processing of the system for use by external business applications, such as invoicing or management systems.

BRIEF SUMMARY OF THE INVENTION

An integrated content production environment includes a connected services framework providing connectivity to a set of applications that produce content for the media industry. Users in their roles use the integrated environment to perform setting up, ingesting, logging, selecting, editing, reviewing, playout, distributing, and archiving activities. It is one object of the invention to minimize delays by notifying users when their action is requested or needed. It is one object of the invention to maintain a log of action data from both the applications in the system as well as the users of the system. It is one object of the invention enabling external parties to have access to the applications or the activities performed by the system users when the system users or the applications have excess capacity. It is one object of the invention to enable such access to external parties through one or more web services.

One embodiment of the present invention provides dynamic notifications in an integrated content production process. The integrated content production system is a series of applications connected by an enterprise service bus. A notification message is automatically sent to a recipient when that recipient is needed to perform a particular production activity. The notification message may include a reference to the production activity.

One embodiment of the present invention provides tracking of both human actions and computer system actions in the integrated content production system. The actions tracked may be between a human and the system, between two applications in the system, between an application and content data, between an external system and an exposed web service, etc. Action data is produced for each action and may be stored in a log file. The action data may include payload data. The payload data may be the contents of a SOAP message, a graphic file representative of a content asset, encoded key frame image data, etc.

One embodiment of the present invention leverages excess capacity in the integrated content production environment. Capacity is identified and a web service for accessing functionality of the system is exposed to an external system. Capacity may be for a single application in the environment, for an integrated set of applications, or for the work accomplished by one or more environment personnel. A content asset may be received from the external system and one or more environment personnel may be instructed to act upon the content asset to generate a deliverable asset. Payment may be received by the external system for its call to the web service.

BRIEF DESCRIPTION OF THE DRAWINGS

FIG. 8 is a screen shot of the "order media" feature.

FIG. 14 is a screen shot of the log file feature.

DETAILED DESCRIPTION OF THE INVENTION

In current broadcast environments, the tasks brought together by the present invention are stand-alone and require that personnel perform the process steps with little controlling structure to produce a piece of content. The present invention links together these disparate systems into a well-controlled process that reduces the reliance on human interaction. Microsoft's Connected Services Framework (the "CSF") software system is one of the components making up the present invention. The CSF enables the tools to be tightly integrated, while at the same time loosely coupled so that individual tools can be swapped in and out as desired. With CSF, the tools do not need to be from a single vendor; the tools can be from any of a number of vendors. The CSF enables the functions from the tools to be visible to the various front-end applications, and creates a 'digital spine' for a production company. This digital spine connects the tools and allows content assets to travel smoothly among them. The CSF is not limited to the content items for the production process and therefore the digital spine also enables sales, marketing, resource scheduling and other types of information to be handled.

Figure 1:
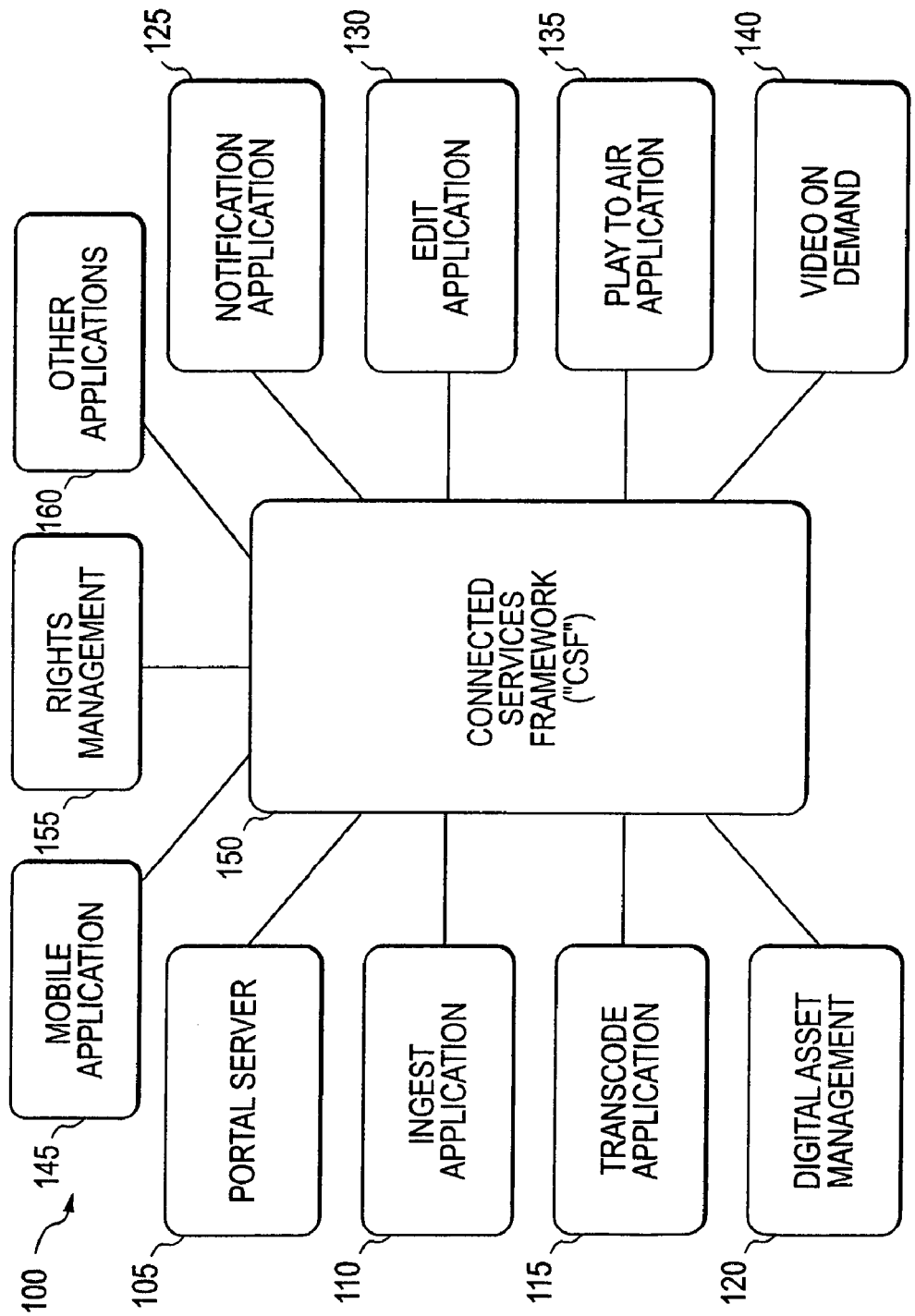
FIG. 1 is a block diagram showing an integrated content production environment in which a connected services framework interconnects various applications.

FIG. 1 is a block diagram showing an integrated content production environment 100 in which a connected services framework 150 is an enterprise service bus that interconnects various applications that assist in performing content production activities. These applications may include, among others, a portal server 105, an ingest application 110, a transcode application 115, a digital asset management system 120, a notification application 125, an edit application 130, a play to air application 135, a video on demand system 140, a mobile application 145, a rights management application 155 and other applications 160. The applications may be vendor applications or custom built applications.

The portal server 105 may be the SHAREPOINT PORTAL SERVER sold by Microsoft Corporation. The ingest application 110 may include a PANASONIC P2 ("Professional Plug-in") camera, which has a solid state P2 memory card. The transcode application 115 may be a TELESTREAM FLIP-FACTORY and TELESTREAM MEDIA APPLICATION PLATFORM ("MAP") system. The digital asset management ("DAM") application 120 may be the NORTH PLAINS TELESCOPE system. The notification application 125 may be enabled using the MICROSOFT LIVE COMMUNICATION server. The edit application 130 may be AVID UNITY MEDIANETWORK and AVID NEWSCUTTER XP editing software or Final Cut Pro HD editing software. The play to air application 135 may be a OMNIBUS VIDEO NETWORKS media system controlling OMNEON play-to-air servers. The video on demand application 140 may be MICROSOFT TV INTERNET PROTOCOL TELEVISION software platform. The mobile application 145 may be the MICROSOFT PORTABLE MEDIA CENTER system.

Figure 2:
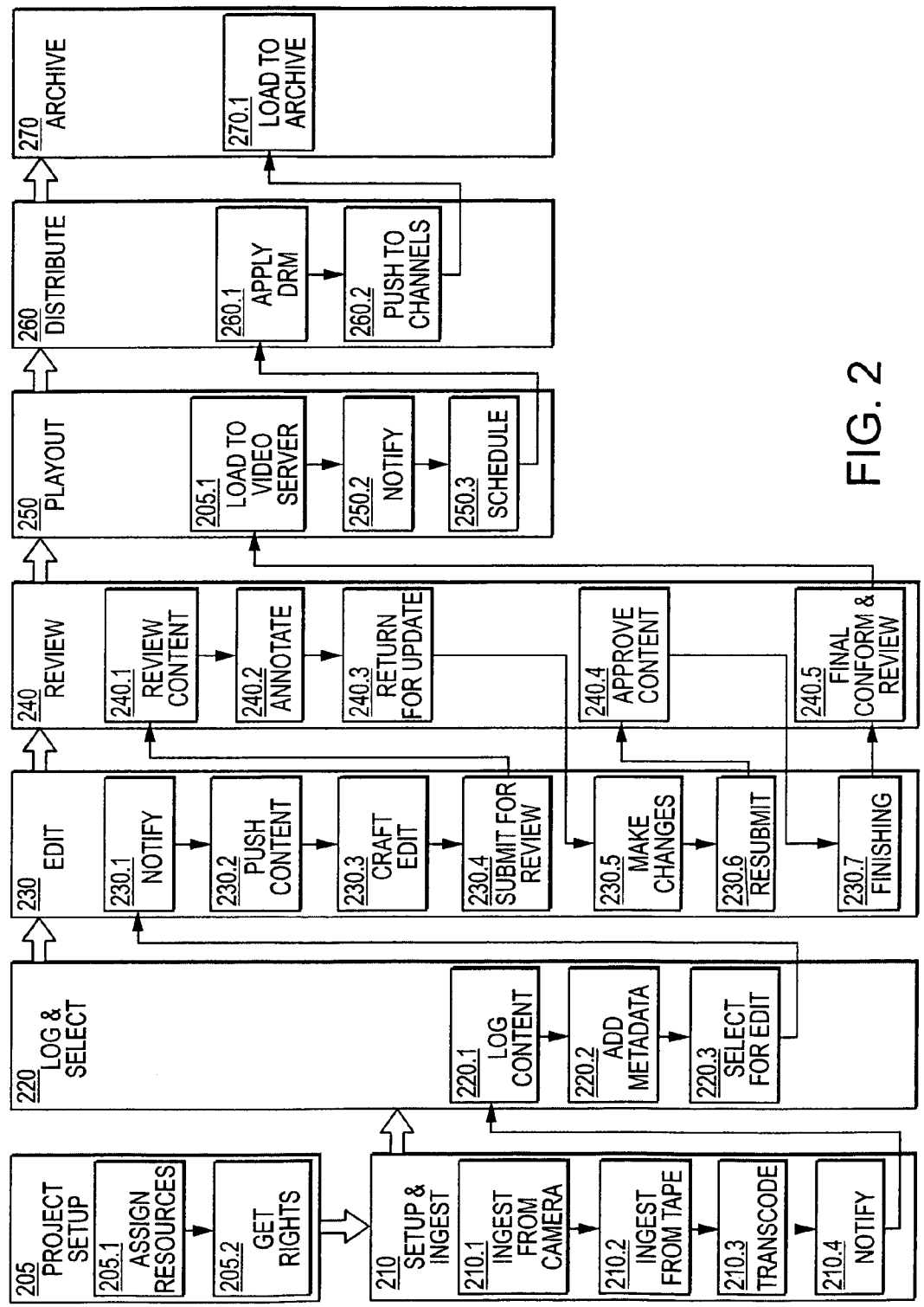
FIG. 2 is a flowchart that illustrates the procedures followed when using one embodiment of the invention.

FIG. 2 illustrates one of several possible embodiments of the invention. The embodiment shown in FIG. 2 uses the technology from FIG. 1 to provide a seamless, end-to-end digital production workflow, which can be conceptualized as eight stages, starting with setting up the project 205, then setting and ingesting the content 210 and proceeding through distributing 260 and finally archiving 270 the finished broadcast. The Connected Services Framework of the present invention provides flexibility to adapt the workflow and the applications used to suit the needs and changing circumstances of a production organization.

Figure 3:
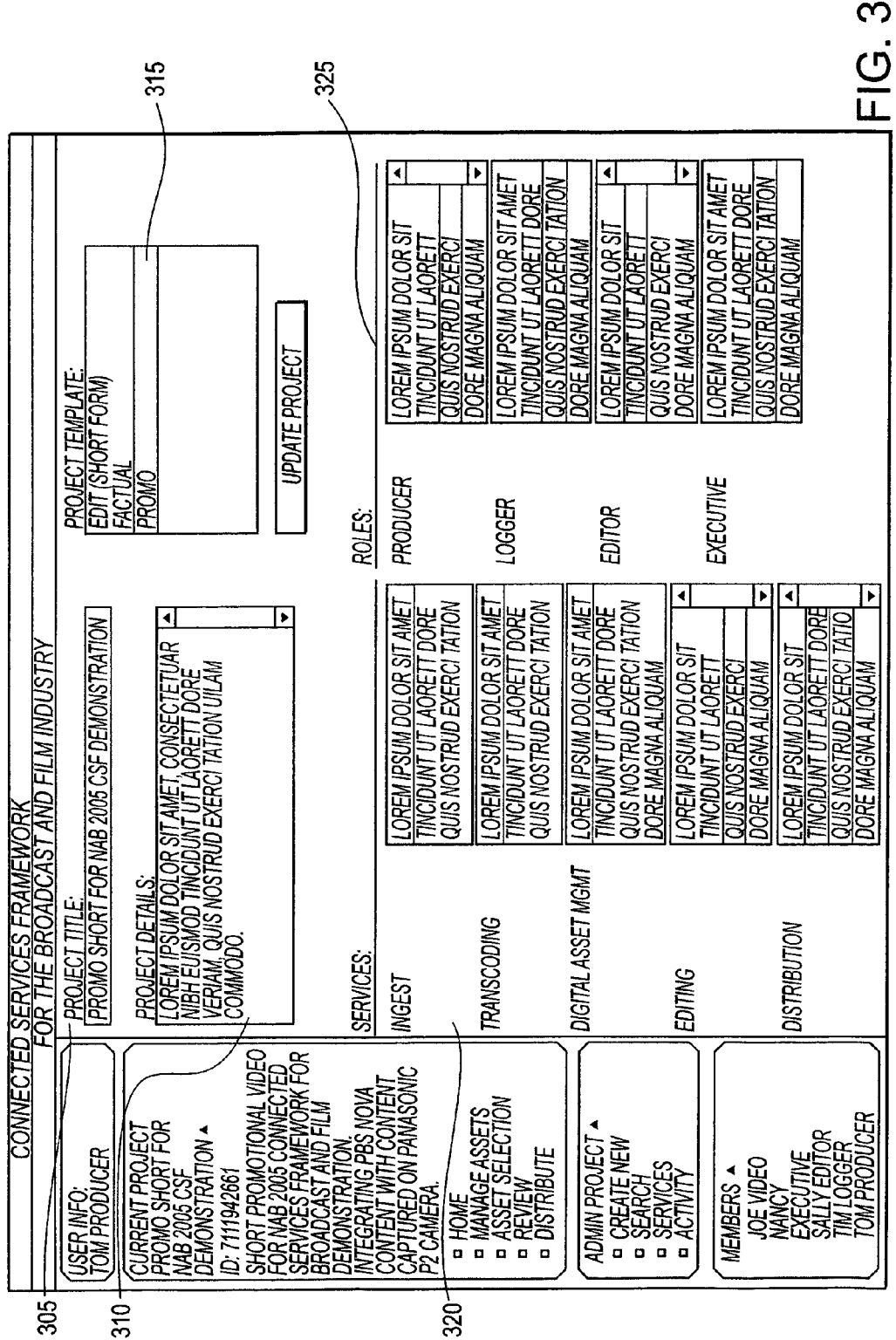
FIG. 3 is a screen shot of a new project being set up in the system.
Figure 4:
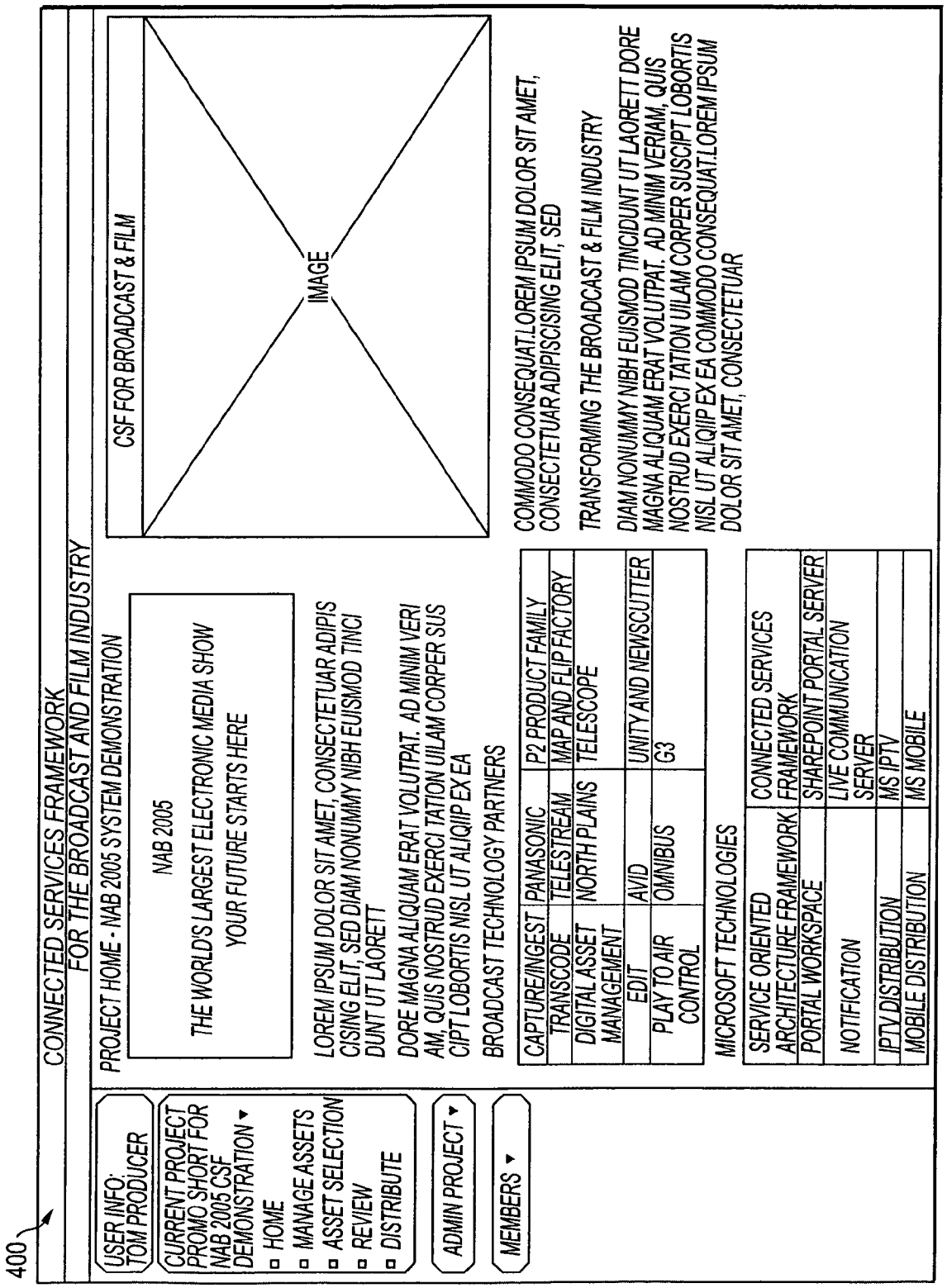
FIG. 4 is a screen shot of a project home page generated when a new project is created.

The project may first be setup by creating a template in the system. During this setup stage, plans and comments from the producers and executives can be centrally stored in the system and approval for the work may be obtained. FIG. 3 is a screen shot of a new project being set up in the system. The project is assigned a title 305. Details are captured for the project 310 and a template is chosen 315. At this point, the location for the various services to be performed are chosen 320 and the key players are assigned, such as the producer, logger, editor and executive 325. FIG. 4 is a screen shot showing that a project home page 400 is generated for the portal server 105 when a new project is created. This home page 400 allows team members to share information and to collaborate on the project. Through use of the screens in FIGS. 3 and 4, the invention enables users to set up multiple projects that can run in parallel.

At the start of a new project, it must first be setup 205. This includes assigning resources to the project 205.1 and negotiating/acquiring rights for the content 205.2. Once a new project is set up, content for it can be ingested from a camera 210.1 or a storage device, such as a tape deck 210.2 or P2 ingest deck, all of which can be controlled remotely. The control allows the operator to choose the desired in- and out-points from the footage. Once the shots are selected, the camera or storage device are cued as necessary and the content is ingested into the CSF system. During the ingestion, the content may be transcoded in a number of formats 210.3. For example, a broadcast-quality format may be a first format and a second format may be for later streaming over the internet for display by a computer's Windows media player or similar software.

Once the content has been ingested and transcoded, the invention may generate an automatic notification 210.4 to the logger to inform the logger that the content is ready. This notification can be through an instant message, an e-mail message, a voice mail message, a task item, a calendar item or other type of message. The notification can include a reference to the content or to the content production activity that the person being notified needs to perform. The reference may be instructions about the next content production activity. Or, the reference may be a link to an entry point of the application to be used by the recipient. This link enables the person responsible for logging to quickly and easily jump to the content or to the application that person will use to modify the content.

Figure 5:
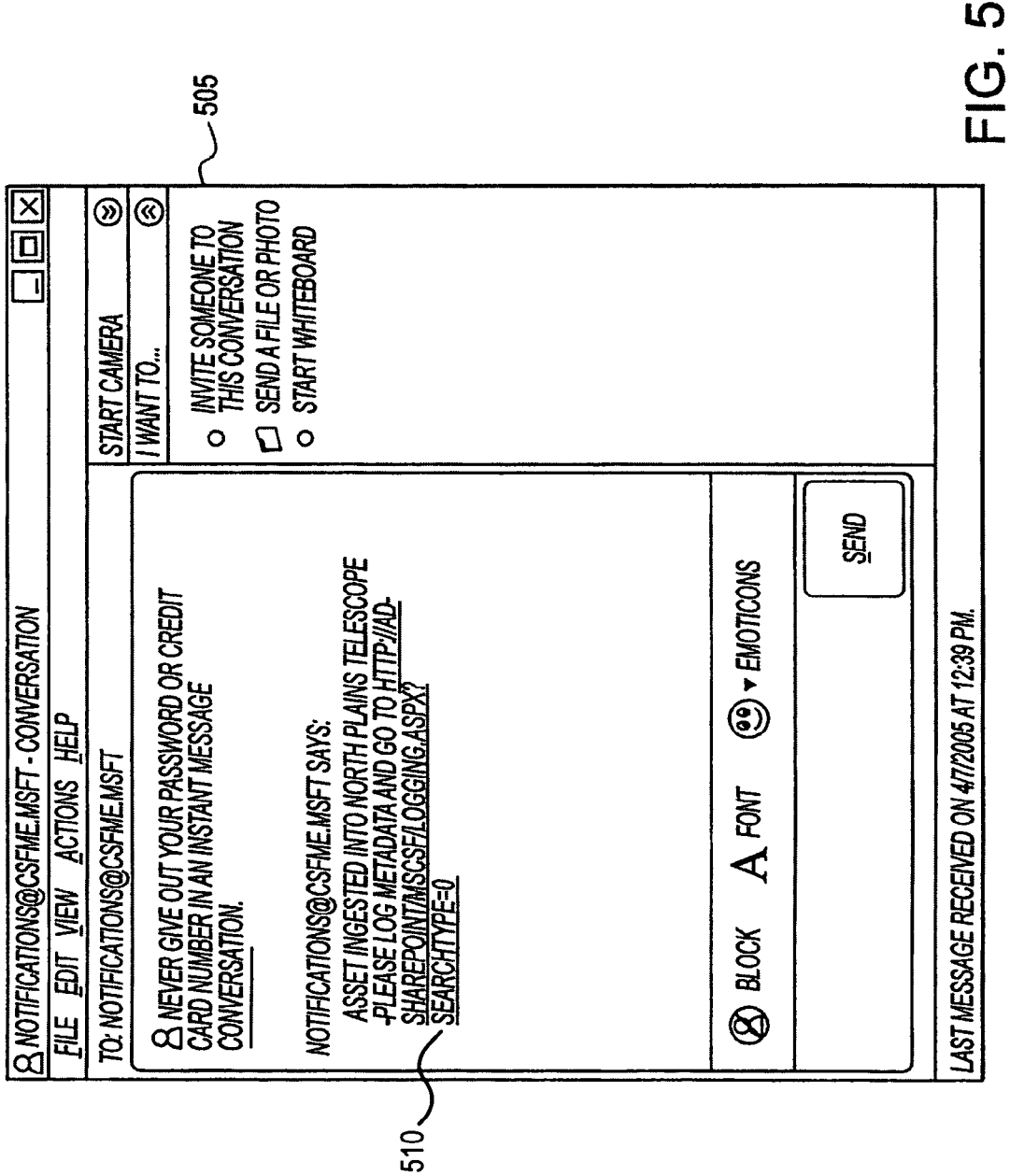
FIG. 5 is a screen shot showing an automated instant message.

In some embodiments, multiple notifications are sent. For example, the producer may be notified in addition to the logger to enable the producer to stay up-to-date on the progress of the project. In another embodiment, the same person may be informed two different ways. For example, both a voice mail and an e-mail message may be sent to the logger. FIG. 5 is a screen shot showing an automated instant message 505 indicating that the content asset has been ingested and is ready for metadata to be logged. This instant message includes a link 510 to the logging process.

The system may allow users to set up the preferred means for notification. For example, the logger may choose ahead of time that she wishes to be notified via an instant message while a producer may choose ahead of time that he wishes to be notified both via instant message as well as voice mail. The system may also leverage a set of notification rules to determine how to notify the one or more recipients. For example, work, vacation, or responsibility schedules may be used with rules to determine who the system notifies and by which medium.

Figure 6:
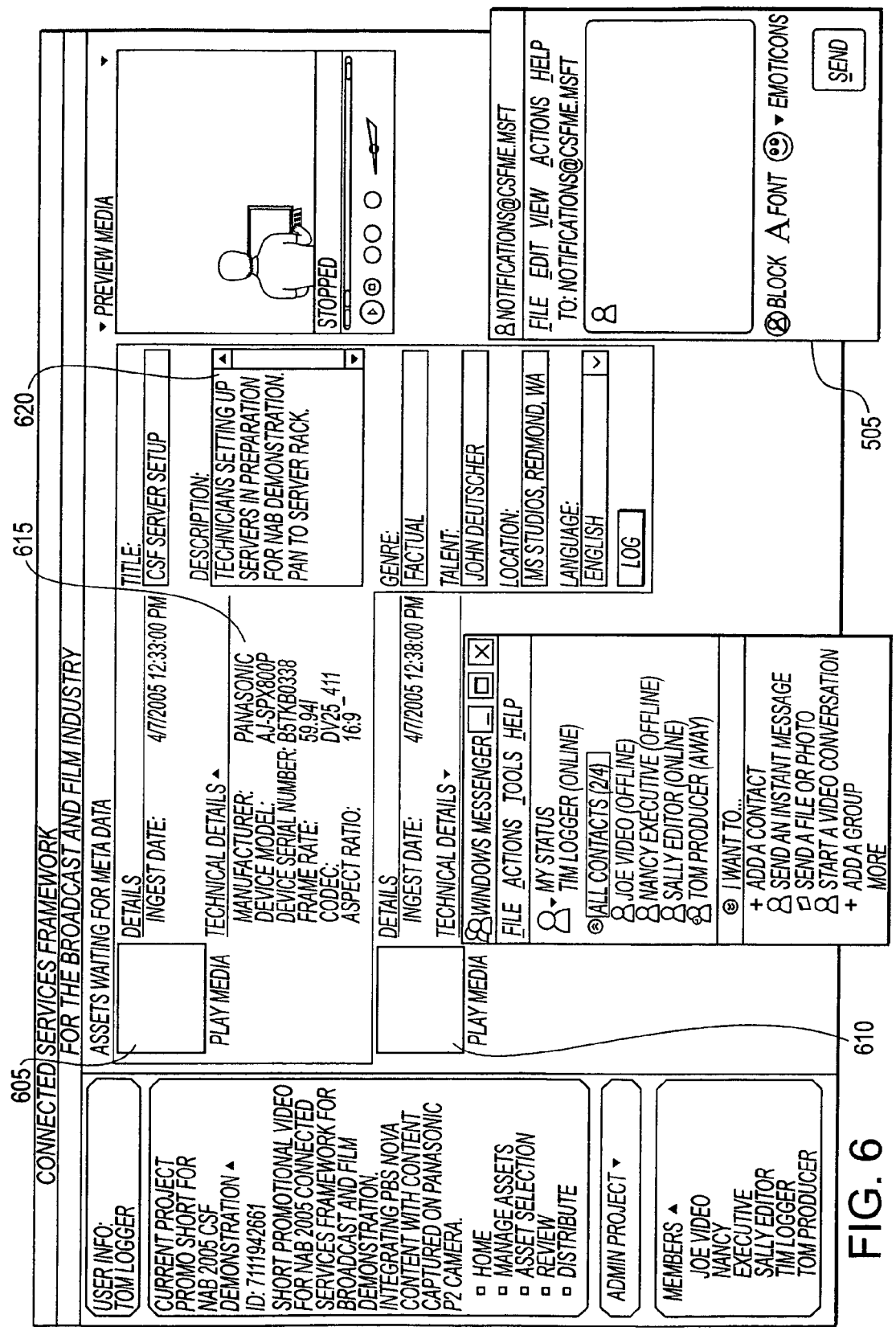
FIG. 6 is a screen shot showing that there are content assets waiting to be logged.

The next stage of content production (i.e, the logging stage 220), includes the logging of content 220.1, the addition of metadata to the content 220.2, and selecting the content for editing 220.3. After a user is notified (210.4) that there is new content footage, when she is available she can log information about the content, such as the subject, the location, and the shooting date. The content can be organized into its appropriate project. FIG. 6 is a screen shot showing that there are content assets 605 and 610 for the project that are waiting to be logged with metadata. The logger may select either asset to be played. The logger can also review any associated technical meta data 615 (from the MXF file, for example) for the asset. Having reviewed the clip, the logger can assign descriptive metadata to the asset 620. If desired, the logger can mark up the "circle takes". Circle takes indicate the best or most appropriate takes in the content from a number of shots.

Figure 7:
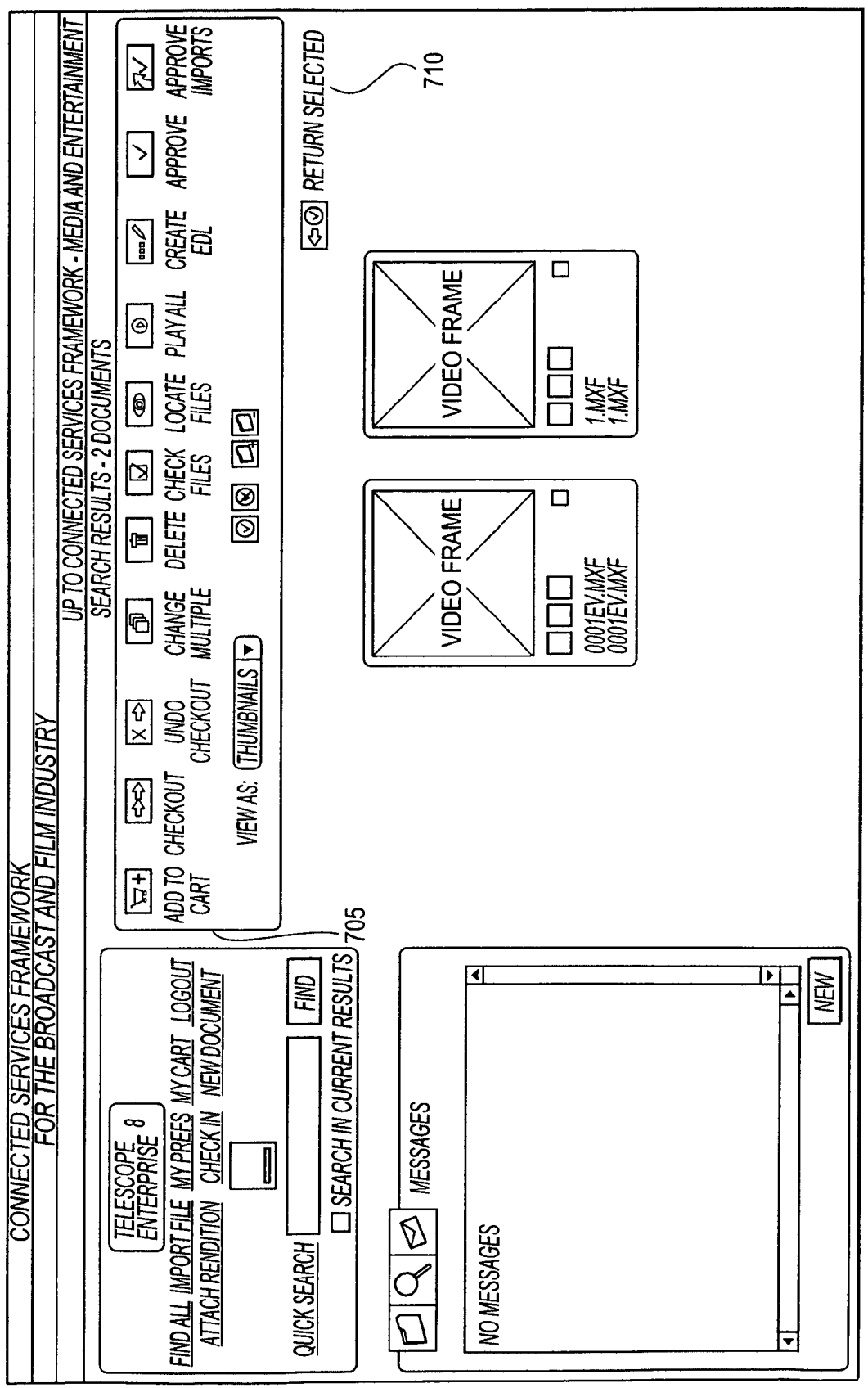
FIG. 7 is a screen shot showing a search interface for the DAM.
Figure 9:
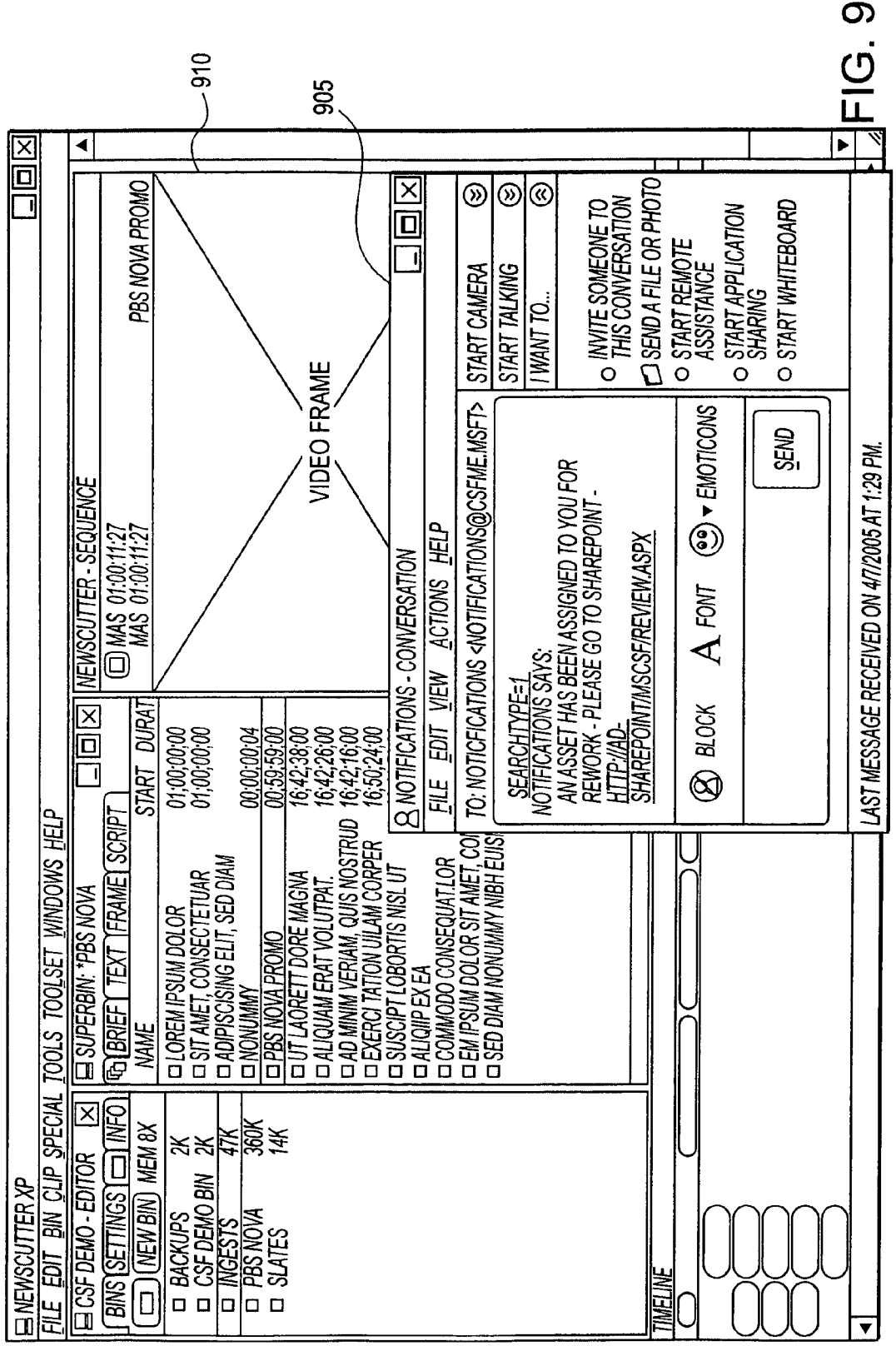
FIG. 9 is a screen shot showing the edit application.

In one embodiment, a producer is notified of new assets and she uses the digital asset management ("DAM") 120 system to select assets for editing. FIG. 7 shows that a search interface 705 for the DAM is embedded within the invention to enable the selection of assets. When the producer is finished selecting assets for editing, the producer can click on the appropriate button 710 to be re-directed to an "order media" area of the invention 805, as shown in FIG. 8. From here, the producer can order (i.e., arrange) the clips into a sequence, add detailed instructions 810 to the edit package, and send the request to the Editor 815.

At this point, a notification is sent to the editor 230.1 and 905 notifying the editor of the new edit work package. As in step 210.4, the notification can be an automated instant message, voice mail message, e-mail message, or other type of notification that is sent to one or more people. The notification can also be a combination of these. The invention transfers the assets from the DAM 120 to the edit application 130 and 910 via the CSF 150. In the editing stage 230, what is known in the industry as 'dailies' are pushed to a craft edit station 230.2. A notification can be sent to the correct editor to let her know that new material is available for editing. The editor then works at the craft edit station 230.3 and edits the footage to create a rough edit according to instructions from the producer. When the edit is complete, the editor exports the newly edited media to a project export folder, which causes the CSF 150 to route the asset to the DAM 120. The editor also submits the edited media to the producer for review at stage 230.4.

Figure 10:
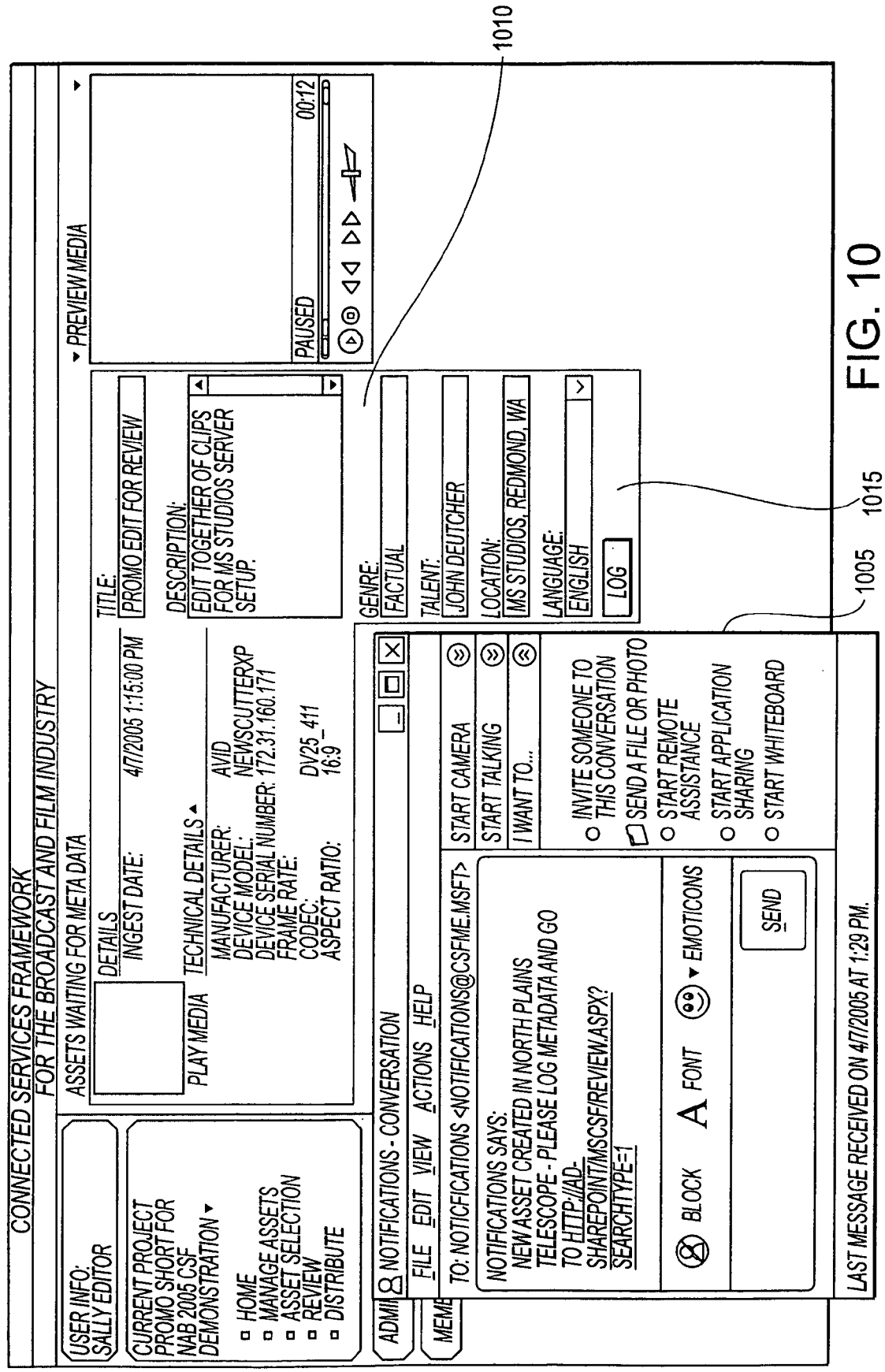
FIG. 10 is a screen shot showing meta data being logged.

When the newly created asset has been uploaded into the DAM 120, an automated notification 1005 (from FIG. 10) is sent to the editor inviting the editor to log the asset. The notification may include a URL to the logging page. The editor enters the new metadata 1010 and clicks the "Log" button 1015. This causes a message to be sent via the CSF 150 to the DAM 120 to update the metadata for the new asset.

Figure 11:
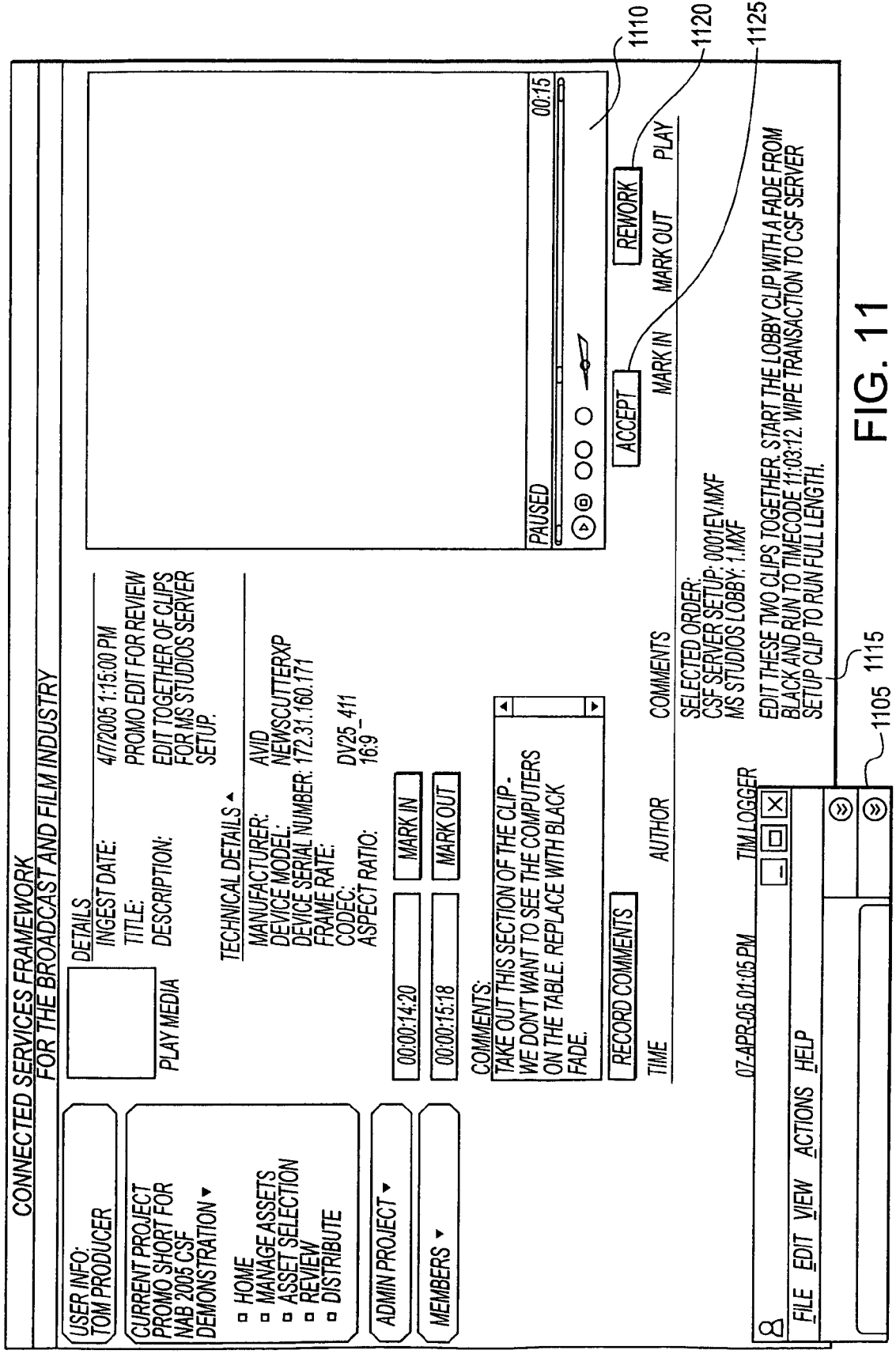
FIG. 11 is a screen shot of the review screen.
Figure 12:
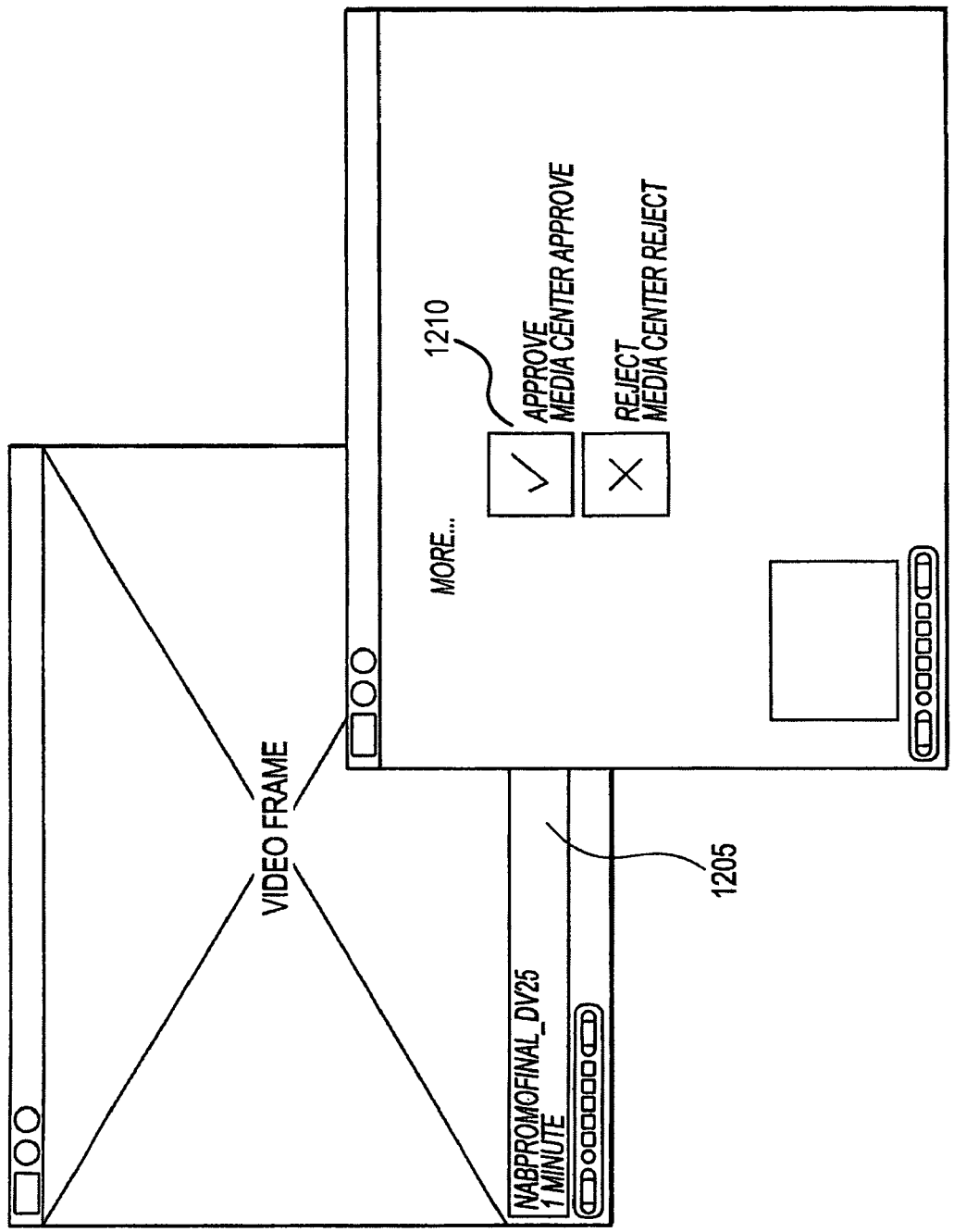
FIG. 12 is a screen shot of the executive review feature.

The reviewing stage 240 begins by the producer being notified by an automated notification message 1105 that an edit is available for review. This notification may include a link to the review screen (shown in FIG. 11). Here, the producer may review 240.1 the rough edit through a web front-end 1110 or a set top box. During his review, the producer annotates the rough edit by adding his notes 240.2 and 1115. In some embodiments, the notes are linked to a particular frame or timecode and allow for pen-based input. Such a feature allows a mark up on a particular show and accepts a sketch of what changes need to be made. Once the producer is finished making his comments, he may click the "rework" button 1120 to return the rough edit to the editor 240.3.

The editor is automatically notified that the comments from the producer have been delivered and further editing is requested. The editor then goes through the producer's comments and reviews the archive footage. He may import some of this archived footage into the rough edit. In some embodiments, rights management information is included with the archive footage. The information may be included alongside the footage in a textual format, or the information may be embedded digitally or graphically within the footage or the medium upon which the footage is stored. The producer and editor can communicate via VOIP or instant message as the editor makes the requested changes 230.5. The second version of the edit is then resubmitted 230.6 by the editor to the producer and the producer reviews all of the changes. If everything is in order, the producer approves the content at stage 240.4 and clicks the "Accept" button 1125. An executive is then automatically notified that the program is ready for approval for distribution. For ease of review, the executive can review the program through a regular television via the video on demand application 140 and 1205. The executive can click the "approve" button 1210 to trigger an automated notification to the producer that the content is approved for distribution.

Once both the necessary people approve the program, the editor may receive an automated notification. He may then carry out the finishing process 230.7 which may include sweetening the audio and/or altering the coloration where required. Then the edit decision list ("EDL") is used to conform the broadcast quality media into the finished package 240.5. Previews of the finished program are made available to review by the executive and producer.

The playout stage 250 begins once the program has been conformed. The finished package is loaded to a playout video server 250.1. An automated notification informs the producer that the video has been loaded 250.2. Another notification can been sent to the scheduler/controller, to inform her that the new content is available. Through the notification message, the scheduler/controller can link to the video server to watch a preview of the content. Some final changes may be made to the content, such as adding breaks for commercials. Once this is done, the new program is scheduled for playout 250.3.

Figure 13:
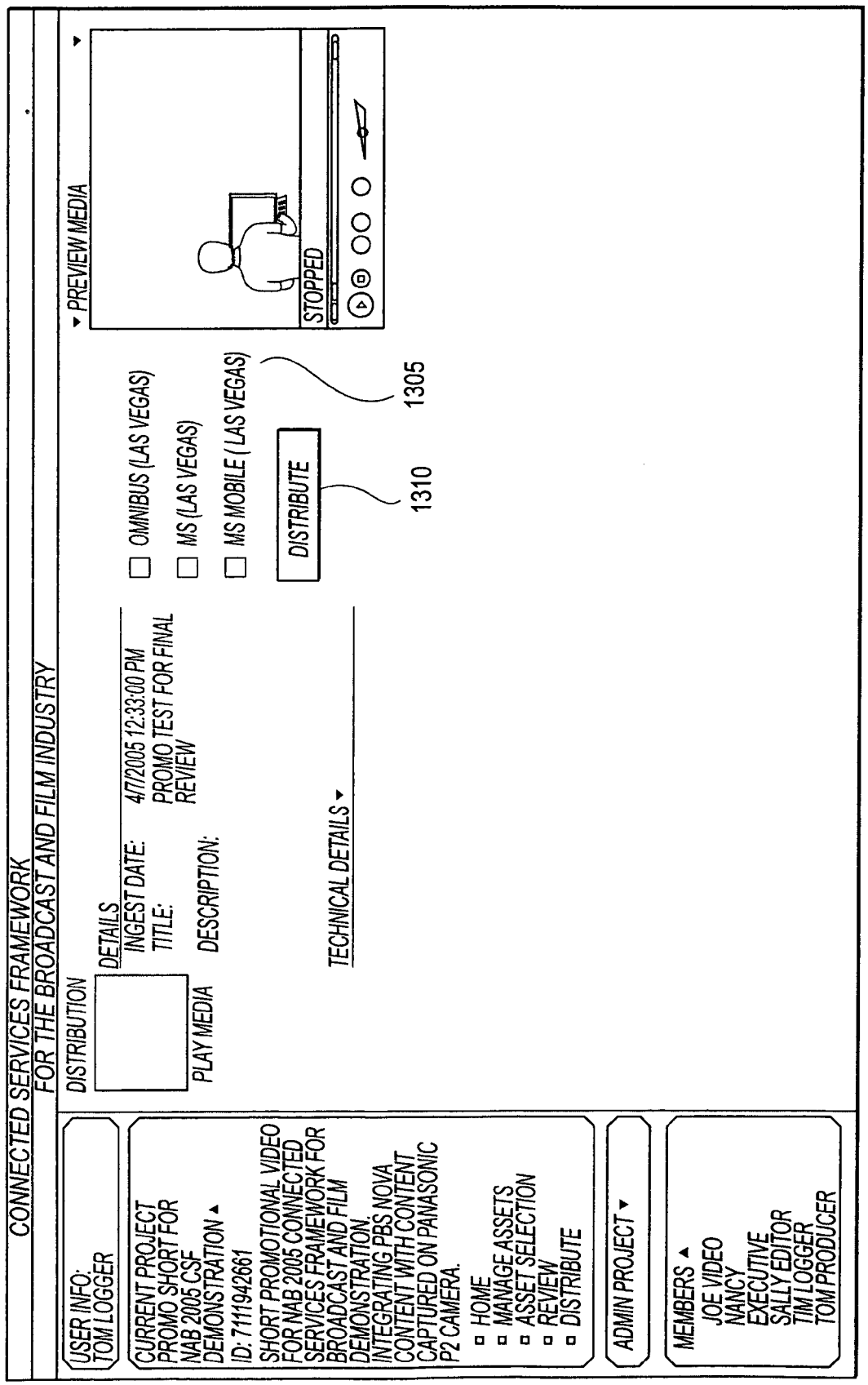
FIG. 13 is a screen shot of the distribution feature.

Digital rights management ("DRM") may be applied to the program to prevent unauthorized duplication 260.1. The schedule triggers a generation of content across the various media channels 260.2 based on a series of profiles which are driven off the metadata distribution options that are selected (1305 in FIG. 13). This allows the content for the Internet to be automatically delivered (1310 in FIG. 13) just after the show is televised, for example.

The finished program, along with the component footage, is then added to the archive 270.1 and is available for other commercial applications. For examples, the program may be sold in DVD format at a later point.

Having now explained the end-to-end steps involved in the integrated content production process, various aspects within that process will now be addressed. Providing a log file of human and non-human activity will first be discussed, followed by a discussion of dynamically triggering notifications. Thirdly, leveraging excess resources will be discussed.

Logging Tool

Throughout the end-to-end production process, the present invention tracks action data in a log file about the events, including the actions taken by the human users as well as the activities undertaken by and between the various applications of the system. Actions with external applications or users via web services may also be tracked in the log file. The log data enables an organization to simply and accurately capture operational data, including edit suit utilization, asset volumes, network performance, etc. This data enables an organization to plan and operate efficiently. FIG. 14 is a screen shot showing a data log file 1405 for one embodiment of the invention. For each event that occurs, the message 1410 and time stamp 1420 are stored in the log.

Action data may include messages that are exchanged between applications and/or users. In certain embodiments, the invention stores the payload 1415 of the messages in the log file. The payload 1415 may be the contents of a SOAP message, encoded key frame image data, or other graphic file representative of the content asset. The payload information 1415 is useful for analyzing the work being undertaken. The payload information 1415 can be used by external applications for billing and other purposes.

Dynamically Triggered Notifications

Figure 15:
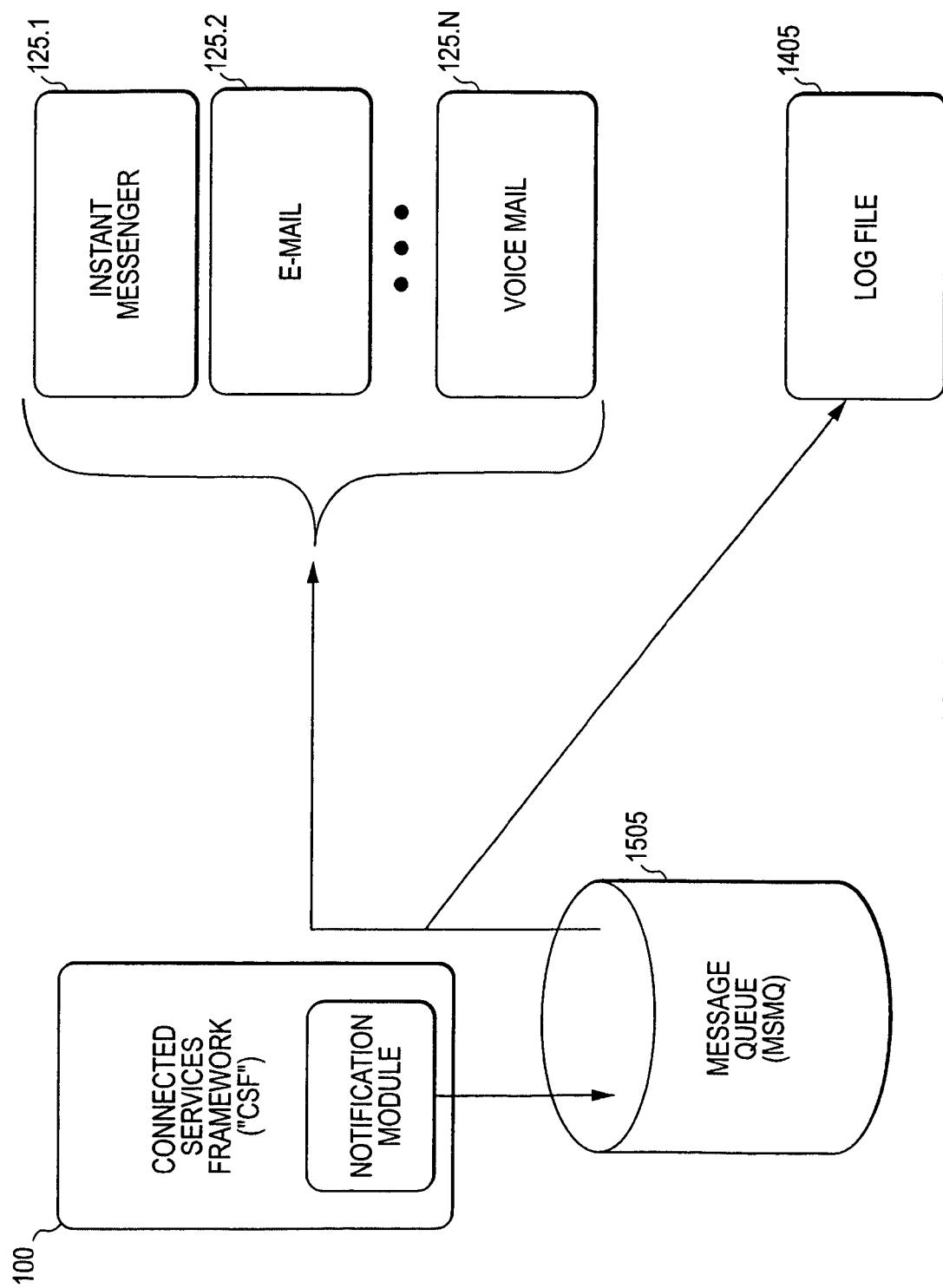
FIG. 15 is a block diagram illustrating dynamically triggered notifications.

FIG. 15 is a block diagram illustrating dynamically triggered notifications. In one embodiment, the CSF 150 sends out all of the notifications as messages to the message queue 1505. The message queue 1505 can be implemented using Microsoft Message Queuing ("MSMQ") technology. MSMQ enables applications to communicate (both synchronously and asynchronously) across networks and systems, even when those networks or systems are temporarily offline. The MSMQ dequeues messages and sends them to the one or more desired notification applications 125, such as an instant messenger application 125.1, an e-mail application 125.2, a voice mail application 125.N, etc. In some embodiments, the notification is sent to a user's calendar or task-list. A copy of the message is also logged 1405.

Leveraging Excess Resources

Normally, the applications 1605 within the integrated content production environment 100 are for use internally within an organization as part of the content production environment. However, from time to time there may be excess capacity or resources by one or more of the applications. Or, from time to time there may be excess capacity from one or more of the personnel working in the content production environment 100. The present invention enables this excess in computing power or people power to be an additional revenue generator.

Figure 16:
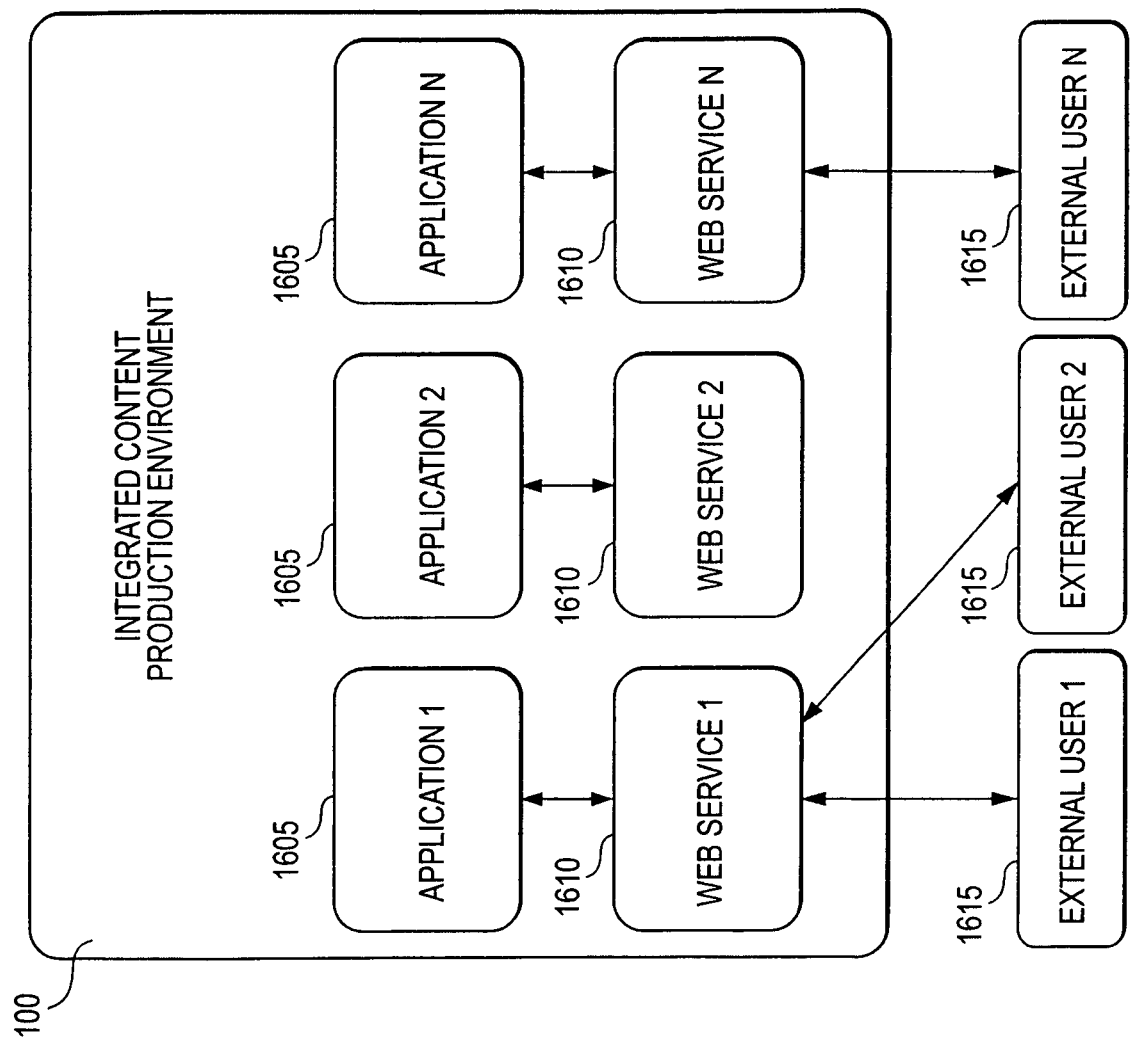
FIG. 16 illustrates one embodiment of leveraging excess resources.

FIG. 16 illustrates one embodiment of leveraging excess resources. This excess is leveraged by allowing outside users 1615 access to one or more of the applications 1605 via one or more web services 1610. In some embodiments, excess capacity for a set of applications is made available to external parties. In yet other embodiments, content assets are received in the content production environment 100 from an external user 1615. One or more production personnel act upon the content asset by executing one or an aggregated series of content production activities to generate a deliverable asset from those actions. This deliverable asset is then sent to the external user 1615. In this way, the external user 1615 is able to accomplish the one or the aggregated series of content production activities by calling the web service.

Access to the applications 1605 may be offered for payment by the external user 1615. In another embodiment, access to the resources may be auctioned off, such as on eBay. Other payment methods may also be applied to this process.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A computer-implemented method for dynamic notifications in an integrated content production process, the computer including a processor and memory and the method comprising steps performed by the computer of:

providing, by the processor, an integrated content production system comprising a plurality of applications connected by an enterprise service bus;

running, by the processor, a first application from the plurality of applications for performing a first content production activity;

automatically sending, by the processor, a first notification message to a first recipient after the first content production activity is finished, wherein the first notification message informs the first recipient to perform a second content production activity of the first application and the first notification message comprises a reference to the second content production activity for completion; and automatically sending, by the processor, a second notification message to a second recipient after the second content production activity is finished, wherein the second notification message informs the second recipient to perform a third content production activity of the first application and the second notification message comprises a reference to the third content production activity for completion;

wherein the step of automatically sending the first notification message comprises:

determining a medium based on a set of notification rules; and sending the first notification message via the medium determined.

2. The computer-implemented method from claim 1, wherein the reference gives instructions to the first recipient regarding the second content production activity.

3. The computer-implemented method from claim 1, wherein the reference links to an entry point of a second application from the plurality of applications.

4. The computer-implemented method from claim 1, wherein the step of automatically sending the first notification message comprises instant messaging the first recipient.

5. The computer-implemented method from claim 1, wherein the step of automatically sending the first notification message comprises sending an e-mail message to the first recipient.

6. The computer-implemented method from claim 1, wherein the step of automatically sending the first notification message comprises sending a task item to the first recipient.

7. The computer-implemented method from claim 1, wherein the step of automatically sending the first notification message comprises sending a calendar item to the first recipient.

8. The computer-implemented method from claim 1, wherein the step of automatically sending the first notification message comprises sending a voice message to the first recipient.

9. The computer-implemented method from claim 1, wherein the step of automatically sending the first notification message comprises sending the first notification message both by a first medium and by a second medium.

10. The computer-implemented method from claim 1, wherein the step of automatically sending the first notification message comprises sending the first notification message by a medium previously chosen by the first recipient.

11. The computer-implemented method from claim 1, wherein at least one of the plurality of applications is a vendor application.

12. A computer program embodied in a non-transitory computer-readable storage medium, for dynamic notifications in an integrated content production process, comprising:
an integrated content production system comprising a plurality of applications connected by an enterprise service bus;
a computer code segment for automatically sending a first notification message to a first recipient, wherein the computer code segment is executed after a user runs a first application from the plurality of applications for performing a first content production activity, the first notification message informs the first recipient to perform a second content production activity of the first application, and the first notification message comprises a reference to the second content production activity for completion; and
a computer code segment for automatically sending, by the processor, a second notification message to a second recipient after the second content production activity is finished, wherein the second notification message informs the second recipient to perform a third content production activity of the first application and the second notification message comprises a reference to the third content production activity for completion;
wherein the computer code segment for automatically sending the first notification message comprises:
determining a medium based on a set of notification rules; and
sending the first notification message via the medium determined.

13. The computer program from claim 12, wherein the reference gives instructions to the first recipient regarding the second content production activity.

14. The computer program from claim 12, wherein the reference links to an entry point of a second application from the plurality of applications.

15. The computer program from claim 12, wherein the computer code segment for automatically sending the first notification message comprises instant messaging the first recipient.

16. The computer program from claim 12, wherein the computer code segment for automatically sending the first notification message comprises sending an e-mail message to the first recipient.

17. The computer program from claim 12, wherein the computer code segment for automatically sending the first notification message comprises sending a task item to the first recipient.

18. The computer program from claim 12, wherein the computer code segment for automatically sending the first notification message comprises sending a calendar item to the first recipient.

19. The computer program from claim 13, wherein the computer code segment for automatically sending the first notification message comprises sending a voice message to the first recipient.

20. The computer program from claim 12, wherein the computer code segment for automatically sending the first notification message comprises sending the first notification message both by a first medium and by a second medium.

21. The computer program from claim 12, wherein the computer code segment for automatically sending the first notification message comprises sending the first notification message by a medium previously chosen by the first recipient.

22. The computer program from claim 12, wherein at least one of the plurality of applications is a vendor application.

23. A system for dynamic notifications in an integrated content production process, comprising:
a computing platform including a processor and memory, the computing platform comprising:
an integrated content production system comprising a plurality of applications connected by an enterprise service bus;
a notification module for automatically sending a first notification message to a first recipient and a second notification message to a second recipient; wherein:
the first notification message is sent after a user runs a first application from the plurality of applications for performing a first content production activity;
the first notification message informs the first recipient to perform a second content production activity of the first application;
the first notification message comprises a reference to the second content production activity for completion;
the second notification message is sent to the second recipient after the second content production activity is finished;
the second notification message informs the second recipient to perform a third content production activity of the first application; and
the second notification message comprises a reference to the third content production activity for completion;
wherein the notification module for automatically sending the first notification message comprises:
determining a medium based on a set of notification rules; and
sending the first notification message via the medium determined.

24. The system from claim 23, wherein the reference gives instructions to the first recipient regarding the second content production activity.

25. The system from claim 23, wherein the reference links to an entry point of a second application from the plurality of applications.

26. The system from claim 23, wherein the notification module for automatically sending a first notification message comprises instant messaging the first recipient.

27. The system from claim 23, wherein the notification module for automatically sending the first notification message comprises sending an e-mail message to the first recipient.

28. The system from claim 23, wherein the notification module for automatically sending the first notification message comprises sending a task item to the first recipient.

29. The system from claim 23, wherein the notification module for automatically sending the first notification message comprises sending a calendar item to the first recipient.

30. The system from claim 23, wherein the notification module for automatically sending the first notification message comprises sending a voice message to the first recipient.

31. The system from claim 23, wherein the notification module for automatically sending the first notification message comprises sending the first notification message both by a first medium and by a second medium.

32. The system from claim 23, wherein the notification module for automatically sending the first notification message comprises sending the first notification message by a medium previously chosen by the first recipient.

33. The system from claim 23, wherein at least one of the plurality of applications is a vendor application.

* * * * *

UNITED STATES PATENT AND TRADEMARK OFFICE
CERTIFICATE OF CORRECTION

PATENT NO.      : 7,836,127 B2
APPLICATION NO. : 11/364411
DATED           : November 16, 2010
INVENTOR(S)     : Stephen Deane et al.

Page 1 of 1

It is certified that error appears in the above-identified patent and that said Letters Patent is hereby corrected as shown below:

On the Title Page, Item (73), in the Assignee, line 2, "Bublin (IE)" should read --Dublin (IE)--.

In claim 19, column 9, line 53, "claim 13," should read --claim 12,--.

Signed and Sealed this
First Day of February, 2011

David J. Kappos
*Director of the United States Patent and Trademark Office*